United States Patent
Lee et al.

(10) Patent No.: US 10,366,226 B2
(45) Date of Patent: Jul. 30, 2019

(54) MALICIOUS CODE ANALYSIS DEVICE AND METHOD BASED ON EXTERNAL DEVICE CONNECTED VIA USB CABLE

(71) Applicant: ELECTRONICS AND TELECOMMUNICATIONS RESEARCH INSTITUTE, Daejeon (KR)

(72) Inventors: Junghee Lee, Daejeon (KR); Sangrok Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 328 days.

(21) Appl. No.: 15/273,984

(22) Filed: Sep. 23, 2016

(65) Prior Publication Data

US 2017/0235945 A1    Aug. 17, 2017

(30) Foreign Application Priority Data

Feb. 15, 2016 (KR) .......................... 10-2016-0017163

(51) Int. Cl.
*G06F 7/04* (2006.01)
*G06F 21/52* (2013.01)

(52) U.S. Cl.
CPC .................................... *G06F 21/52* (2013.01)

(58) Field of Classification Search
CPC ... H04L 29/06918; G06F 21/50; G06F 21/53; G06F 21/56; G06F 21/57; G06F 21/561; G06F 21/52

(Continued)

(56) References Cited

U.S. PATENT DOCUMENTS 7,930,531 B2 * 4/2011 Chow .................. G06F 21/568
   713/2
8,560,826 B2 * 10/2013 Wu ....................... G06F 9/4401
   713/1

(Continued)

FOREIGN PATENT DOCUMENTS

KR    10-1291127 B1    8/2013
KR    10-1512456 B1    4/2015

(Continued)

OTHER PUBLICATIONS

Xing et al, Upgrading Your Android Elevating My Malware: Privilege Escalation Through Mobile OS Updating, IEEE, 2014, pp. 393-408.*

(Continued)

*Primary Examiner* — Luu T Pham
*Assistant Examiner* — Jenise E Jackson
(74) *Attorney, Agent, or Firm* — LRK Patent Law Firm (57) ABSTRACT

A malicious code analysis device and method used on an external device connected via a USB cable. The malicious code analysis method includes connecting a malicious code analysis device to an analysis target terminal, on which malicious code is to be executed, from outside the analysis target terminal via a USB cable, multi-booting the analysis target terminal based on multiple Operating System (OS) image files stored in the malicious code analysis device; providing user input to the analysis target terminal so that malicious code is incapable of recognizing that a current environment is an analysis environment, and analyzing, by the malicious code analysis device, the malicious code in consideration of both data modified by the malicious code, among pieces of data corresponding to the multiple OS image files, and the user input.

12 Claims, 8 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 8,584,243 | B2* | 11/2013 | Britton | G06F 21/56 |
| | | | | 713/188 |
| 9,092,626 | B2* | 7/2015 | Britton | G06F 21/56 |
| 2008/0052507 | A1* | 2/2008 | Chow | G06F 21/568 |
| | | | | 713/2 |
| 2011/0265183 | A1* | 10/2011 | Wu | G06F 9/4401 |
| | | | | 726/24 |
| 2014/0032893 | A1* | 1/2014 | Wu | G06F 9/4401 |
| | | | | 713/2 |
| 2014/0082732 | A1* | 3/2014 | Britton | G06F 21/56 |
| | | | | 726/24 |
| 2015/0212747 | A1* | 7/2015 | Hutchison | G06F 21/53 |
| | | | | 711/154 |
| 2015/0324580 | A1 | 11/2015 | Lee et al. | |
| 2016/0028768 | A1* | 1/2016 | Yu | H04L 63/145 |
| | | | | 726/23 |

FOREIGN PATENT DOCUMENTS

| | | |
|---|---|---|
| KR | 10-2015-0129357 A | 11/2015 |
| KR | 10-1593183 B1 | 2/2016 |

OTHER PUBLICATIONS

Kwon et al, Automatic Detection of Unsafe Dynamic Component Loadings, IEEE, Apr. 2012, vol. 38, No. 2, pp. 293-313.*
Fu et al, Subverting System Authentication with Context Aware, Reactive Virtual Machine Introspection, ACM, Dec. 13, 2013, pp. 229-238.*
Dhilung Kirat et al., "BareBox: Efficient Malware Analysis on Bare-Metal," ACSAC, Dec. 2011.
Paul Royal, "Entrapment: Tricking Malware with Transparent, Scalable Malware Analysis," Blackhat 2012 Europe, 2012.
Dhilung Kirat et al., "BareCloud: Bare-metal Analysis-based Evasive Malware Detection," USENIX, 2014.

* cited by examiner

MALICIOUS CODE ANALYSIS DEVICE AND METHOD BASED ON EXTERNAL DEVICE CONNECTED VIA USB CABLE

CROSS REFERENCE TO RELATED APPLICATION

This application claims the benefit of Korean Patent Application No. 10-2016-0017163, filed Feb. 15, 2016, which is hereby incorporated by reference in its entirety into this application.

BACKGROUND OF THE INVENTION

1. Technical Field

The present invention generally relates to the analysis of malicious code and, more particularly, to a malicious code analysis device and method based on an external device connected via a USB cable, which are capable of observing and analyzing the actual activity of malicious code that recognizes that the current environment is a malicious code analysis environment and that avoids being executed, and which enable a connection to be easily made based on a USB cable.

2. Description of the Related Art

Generally, when malicious code is analyzed, methods for constituting an analysis environment in a clean state using environment restoration technology and executing and analyzing the malicious code in a virtual environment (or a virtual machine) have been widely used. Here, a method using a virtual environment is advantageous in that, even if malicious code is executed, the activity of the malicious code can be easily separated from the actual user environment. Further, the method using a virtual environment is advantageous in that, after malicious code is executed, the execution environment can be easily restored to the original clean environment in order to execute additional malicious code, and thus most malicious code analysis is currently performed based on the method using a virtual environment.

As a virtual environment that is used in a malicious code analysis system, there is VMWare, Virtual-PC, Quick Emulator (QEMU), or Kernel-based Virtual Machine (KVM) in the case of a PC, and there is TaintDroid or the like on an Android OS in the case of a mobile terminal. However, as the analysis methods using virtual environments become known, methods which enable malicious code to recognize the virtual environments have recently been developed. By means of these methods, in a virtual environment, an operation differing from that performed in an actual environment is performed, thus making it difficult to analyze and detect malicious code.

In order to observe and analyze the actual activity of malicious code that uses such an avoidance technique, a definite solution is to execute malicious code in the actual environment and to observe, extract and analyze the activity of the target malicious code from outside the malicious code execution environment (Out-Of-Box/Out-Of-Guest). Despite this solution, there are still several issues to be solved in the actual environment-based analysis. A representative issue thereof is to extract the activity of malicious code from outside the malicious code execution environment. Conventional technology uses a method for, after malicious code has been executed, extracting the modified state of the hard disk of a target system (hard disk forensics) and determining the activity of the malicious code. However, since this method is intended to extract only the results of modifications made to the target system after the malicious code has been executed on the target system, it is impossible to observe the activity of the malicious code in detail while the malicious code is being executed, and thus the malicious code cannot be accurately analyzed.

Further, conventional technology uses a method for extracting and storing network packets that are transmitted/received to/from the outside of an analysis target system to observe network activity, and thereafter analyzing the address or data pertaining to an external network that the malicious code attempts to access using the stored network packets. Even in this case, when malicious code uses encrypted data during network communication, the analysis of malicious data in this way is impossible.

In connection with this, Korean Patent Application Publication No. 10-2015-0129357 discloses a technology related to "Apparatus and Method of Analyzing Malicious Code in Actual Environment."

SUMMARY OF THE INVENTION

Accordingly, the present invention has been made keeping in mind the above problems occurring in the prior art, and an object of the present invention is to enable the analysis of environment-aware malicious code in such a way that analysis is performed on an analysis target terminal, which is an actual machine, and malicious code is observed and analyzed from outside the analysis target terminal.

Another object of the present invention is to provide activity simulation for transferring user input as if a user has personally made the user input, thus enabling analysis environment-aware malicious code using the user input to be analyzed.

A further object of the present invention is to enable malicious code to be analyzed in various devices, such as a PC and a mobile device, and in various OS environments, such as Windows and Linux, by analyzing malicious code based on a USB device that is generally used.

Yet another object of the present invention is to accurately detect the activity of malicious code in greater detail by extracting and analyzing the real-time activity caused by the malicious code.

In accordance with an aspect of the present invention to accomplish the above objects, there is provided a malicious code analysis method based on an external device connected via a Universal Serial Bus (USB) cable, including connecting a malicious code analysis device to an analysis target terminal, on which malicious code is to be executed, from outside the analysis target terminal via a USB cable; multi-booting the analysis target terminal based on multiple Operating System (OS) image files stored in the malicious code analysis device; providing user input to the analysis target terminal so that malicious code is incapable of recognizing that a current environment is an analysis environment; and analyzing, by the malicious code analysis device, the malicious code in consideration of both data modified by the malicious code, among pieces of data corresponding to the multiple OS image files, and the user input.

Analyzing the malicious code may include checking at least one OS image file loaded into the analysis target terminal in accordance with the multi-booting, among the multiple OS image files, from outside the analysis target terminal using the malicious code analysis device, and then extracting the modified data.

Analyzing the malicious code may be configured to extract the modified data by comparing the at least one OS image file with at least one original OS image file corresponding to the at least one OS image file, among the multiple OS image files.

Providing the user input may include acquiring the user input using at least one input module connected to the malicious code analysis device; and transferring, by the malicious code analysis device, the user input to the analysis target terminal based on at least one of the USB cable and a communication module included in the malicious code analysis device.

The user input may be at least one of manual input corresponding to at least one of mouse input, keyboard input, and touch input, and automatic input based on a script.

The malicious code analysis method may further include restoring the at least one OS image file using the at least one original OS image file stored in an OS image database (DB), when analysis of the malicious code is completed.

Analyzing the malicious code may include analyzing activity corresponding to the malicious code by combining the modified data with the user input.

In accordance with another aspect of the present invention to accomplish the above objects, there is provided a malicious code analysis device based on an external device connected via a USB cable, including an OS image provision unit for providing multiple OS image files to an analysis target terminal connected via a USB cable; a user input provision unit for providing user input to the analysis target terminal so that, after the analysis target terminal has been multi-booted based on the multiple OS image files, malicious code is incapable of recognizing that a current environment is an analysis environment; a modified data extraction unit for extracting data modified by the malicious code from pieces of data corresponding to the multiple OS image files; and a malicious code analysis unit for analyzing the malicious code in consideration of the modified data and the user input.

The modified data extraction unit may check at least one OS image file loaded into the analysis target terminal in accordance with the multi-booting, among the multiple OS image files, and then extract the modified data.

The modified data extraction unit may extract the modified data by comparing the at least one OS image file with at least one original OS image file corresponding to the at least one OS image file, among the multiple OS image files.

The user input provision unit may acquire the user input using at least one input module, and transfer the acquired user input to the analysis target terminal.

The user input may be at least one of manual input corresponding to at least one of mouse input, keyboard input, and touch input, and automatic input based on a script.

The malicious code analysis device may further include an OS image restoration unit for restoring the at least one OS image file using the at least one original OS image file stored in an OS image database (DB) when analysis of the malicious code is completed.

The malicious code analysis unit may analyze activity corresponding to the malicious code by combining the modified data with the user input.

In accordance with a further aspect of the present invention to accomplish the above objects, there is provided an analysis target terminal, including an OS image loading unit for loading at least one OS image file to be used for multi-booting, among multiple OS image files, from a malicious code analysis device based on an external device connected via a USB cable; a multi-booting unit for performing multi-booting based on the at least one OS image file; and a user input acquisition unit for acquiring user input from the malicious code analysis device so that malicious code is incapable of recognizing that a current environment is an analysis environment.

The user input may occur based on at least one input module connected to the malicious code analysis device.

The user input may be at least one of manual input corresponding to at least one of mouse input, keyboard input, and touch input, and automatic input based on a script.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

Figure 1:
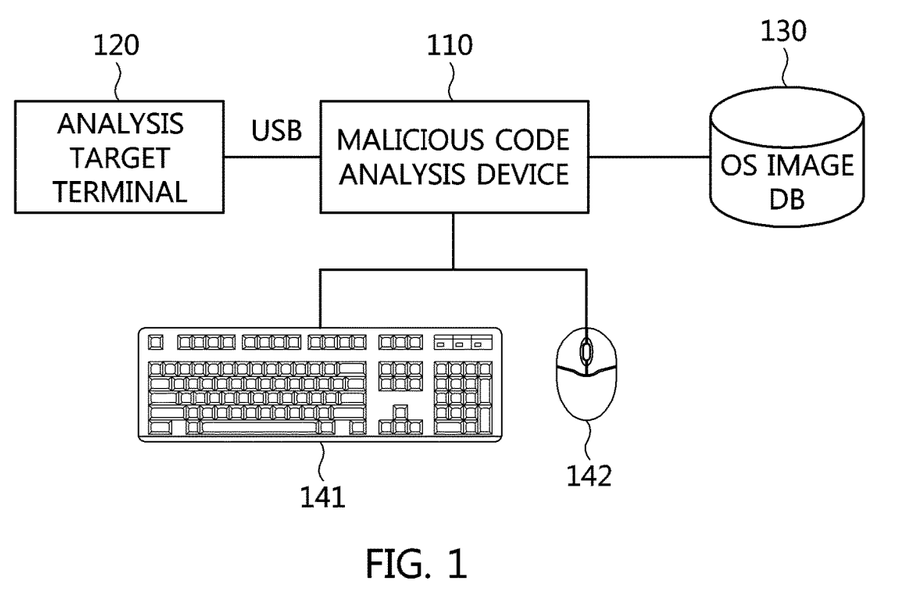
FIG. 1 is a diagram showing a malicious code analysis system based on an external device connected via a USB cable according to an embodiment of the present invention.

FIG. 1 is a diagram showing a malicious code analysis system based on an external device connected via a USB cable according to an embodiment of the present invention.

Referring to FIG. 1, the malicious code analysis system based on an external device connected via a USB cable according to the embodiment of the present invention includes a malicious code analysis device 110, an analysis target terminal 120, an Operating System (OS) image database (DB) 130, and input modules 141 and 142.

The malicious code analysis device 110 may take the form of an external device (a single-board computer) connected via a USB cable. That is, the malicious code analysis device 110 may be a computer equipped with all typical components, including a storage unit, an interface timing unit, and logic units, on a single circuit board.

In the embodiment of the present invention, a description has been made based on a scheme for connecting the malicious code analysis device 110 and the analysis target terminal 120 to each other via a USB cable, but such a connection scheme may be implemented using some other external connection scheme that may be developed in the future.

Further, the malicious code analysis device 110 may be implemented in the form of a single-board computer, a USB computer, a stick computer, a mini computer, or a one-board microcomputer.

The malicious code analysis device 110 provides multiple Operating System (OS) image files to the analysis target terminal 120, which is connected via the USB cable.

Further, the malicious code analysis device 110 provides user input to the analysis target terminal 120 so that, after the analysis target terminal 120 has been multi-booted based on multiple OS image files, malicious code cannot recognize that the current environment is an analysis environment.

The user input may be acquired using at least one input module 141 or 142, and may be transferred to the analysis target terminal 120.

Here, the user input may be at least one of manual input, corresponding to at least one of mouse input, keyboard input, and touch input, and automatic input based on a script.

Further, the malicious code analysis device 110 extracts data modified by malicious code from pieces of data corresponding to the multiple OS image files.

Here, the malicious data may be extracted by checking at least one OS image file, loaded into the analysis target terminal 120 in accordance with multi-booting.

The modified data may be extracted by comparing the at least one OS image file with at least one original OS image file corresponding to the at least one OS image file of the multiple OS image files.

Further, the malicious code analysis device 110 analyzes the malicious code in consideration of both the modified data and the user input.

Here, the activity corresponding to the malicious code may be analyzed by combining the modified data with the user input.

When it is difficult to directly analyze the activity corresponding to the malicious code due to the performance of the malicious code analysis device 110, a combination of the modified data and the user input is provided to a separate external analysis module or external analysis device, thus enabling the malicious code to be remotely analyzed.

Further, when the analysis of the malicious code has been completed, the malicious code analysis device 110 restores the at least one OS image file using at least one original OS image file stored in the OS image DB 130.

The analysis target terminal 120 loads at least one OS image file to be used for multi-booting, among multiple OS image files, from the malicious code analysis device 110 connected via the USB cable.

Further, the analysis target terminal 120 is multi-booted based on the at least one OS image file.

Furthermore, the analysis target terminal 120 acquires user input from the malicious code analysis device 110 so that the malicious code cannot recognize that the current environment is an analysis environment.

The user input may occur based on at least one input module 141 or 142 connected to the malicious code analysis device 110.

In addition, the analysis target terminal 120 may include a device capable of loading and utilizing an OS, for example, a Personal Computer (PC), a notebook computer, a mobile phone, a tablet PC, a navigation device, a smart phone, a Personal Digital Assistant (PDA), a Portable Multimedia Player (PMP), or a Digital Video Broadcasting (DVB) device.

The OS image DB 130 may store original OS image files corresponding to multiple OS image files.

Here, the OS image DB 130 may be configured independent of the malicious code analysis device 110. Alternatively, the OS image DB 130 may be disposed as a component within the malicious code analysis device 110.

Each of the input modules 141 and 142 may be a device capable of making user input, such as a keyboard, a mouse, a touch terminal or a script executer.

Here, an input event occurring based on the input module 141 or 142 may be input to the malicious code analysis device 110, and thus user input may occur.

Figure 2:
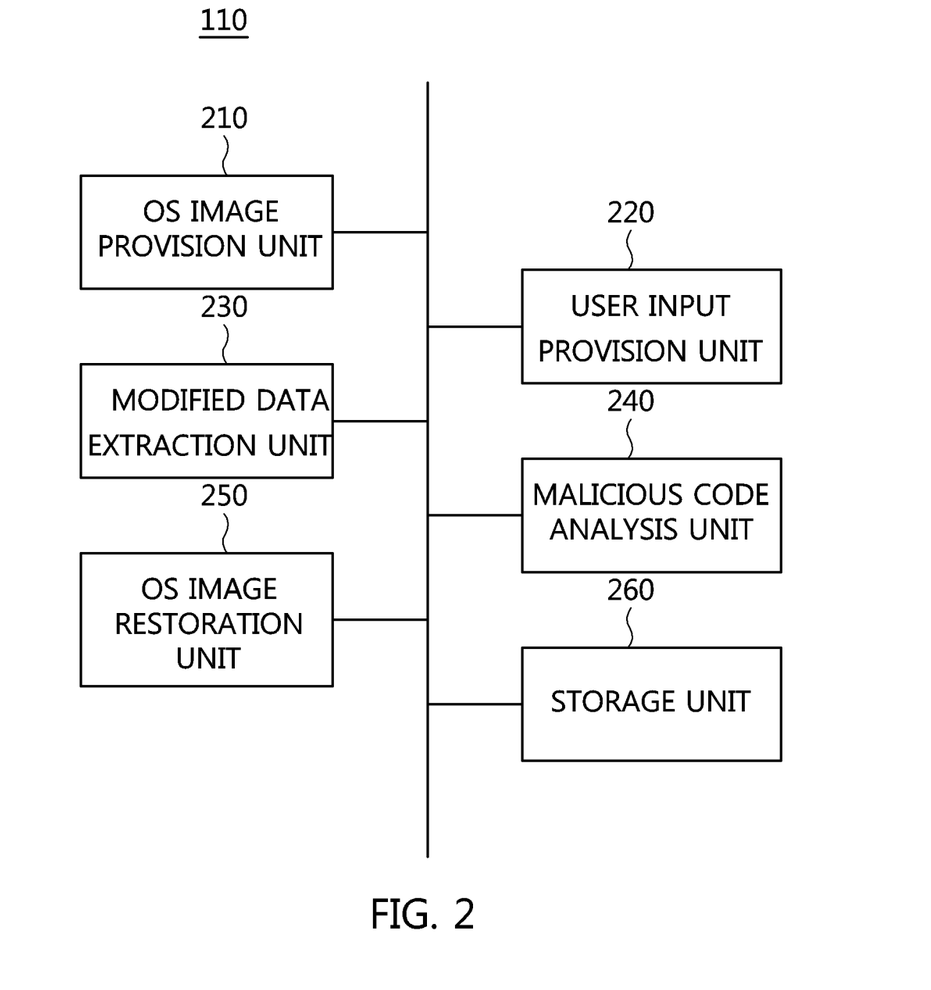
FIG. 2 is a block diagram showing an example of the malicious code analysis device shown in FIG. 1.

FIG. 2 is a block diagram showing an example of the malicious code analysis device shown in FIG. 1.

Referring to FIG. 2, the malicious code analysis device 110 shown in FIG. 1 includes an OS image provision unit 210, a user input provision unit 220, a modified data extraction unit 230, a malicious code analysis unit 240, an OS image restoration unit 250, and a storage unit 260.

The present invention relates to a method for detecting and analyzing the activity of malicious code when the malicious code is executed in an actual environment rather than in a virtual environment using the malicious code analysis device 110, which is externally connected to an analysis target terminal via a USB cable, and a method for restoring an environment that is not contaminated with malicious code based on a contaminated environment.

The OS image provision unit 210 provides multiple OS image files to the analysis target terminal, which is connected via the USB cable.

As analysis techniques using a virtual environment or a sandbox have recently become known as malicious code analysis techniques for PCs and mobile devices, the incidence of malicious code that recognizes such a virtual environment or sandbox and is not executed has increased. Therefore, the present invention intends to provide a malicious code analysis device 110 that is capable of analyzing even malicious code that recognizes such a virtual environment- or sandbox-based analysis environment.

The multiple OS image files corresponding to analysis environments may be provided to the analysis target terminal so that malicious code is executed on the analysis target terminal, which is an actual system, such as a PC or a mobile device, rather than a virtual environment.

Here, pieces of data for the analysis of malicious code are transmitted/received using a USB protocol based on USB, and thus the present invention may be applied to devices equipped with a USB function. Further, since a USB function is supported in various OSs, such as Windows and Linux, the present invention may also be utilized in a PC or a mobile device.

That is, the present invention may be operated in various OSs, such as Windows, Linux, and Android, and may perform monitoring for extracting and analyzing the activity of malicious code in the malicious code analysis device 110, which is a device outside of the analysis target terminal, thus enabling sandbox-aware malicious code to be analyzed.

Further, since the present invention has a structure operating in the actual system, virtual environment-aware malicious code may also be analyzed.

Here, since multiple OS image files are loaded from the external device, which is connected via the USB cable, and are then used for booting, and images in an internal storage device are not used, they may be more easily added, modified and deleted by the external device.

Here, OS image files previously booted on the analysis target terminal may already contain data modified by the malicious code. Therefore, for the accuracy of analysis, the analysis target terminal is booted based on the multiple OS image files provided by the malicious code analysis device 110 before the malicious code is analyzed, and thus analysis may be initiated in a clean analysis environment uncontaminated with malicious code.

The user input provision unit 220 provides user input to the analysis target terminal so that, after the analysis target terminal has been multi-booted based on the multiple OS image files, the malicious code cannot recognize that the current environment is an analysis environment.

Here, by providing the user input to the analysis target terminal, even malicious code, which recognizes that the current environment is an automatic malicious code analysis environment based on whether user input has occurred, may also be analyzed. That is, as in the case of the user input, activity simulation for transferring user input as if the user had personally made the user input may be provided.

Here, user input may be acquired using at least one input module, and the acquired user input may be transferred to the analysis target terminal. For example, the user input occurring in the at least one input module may be transferred to the analysis target terminal connected to the input module via the USB cable.

Here, the user input may be at least one of manual input corresponding to at least one of mouse input, keyboard input, and touch input, and automatic input based on a script. For example, the user input may be manually made by allowing the user to personally manipulate a keyboard or a mouse or, alternatively, the user input may be generated and transferred using an automated method such as a script.

The modified data extraction unit 230 extracts data modified by malicious code from pieces of data corresponding to multiple OS image files.

Here, when executable code (monitoring code) for detecting the execution of malicious code is executed in an environment in which malicious code is executed, there may be difficulty in analyzing malicious code because the activity of monitoring code and the activity of the malicious code occur simultaneously.

Therefore, the present invention may provide an environment in which malicious code may be analyzed in an external space separate from an actual machine by loading an OS image file into the analysis target terminal on which malicious code is executed through the malicious code analysis device 110, which is externally connected via the USB cable. Further, real-time activity corresponding to intermediate activity, as well as the results of the activity of the malicious code, may be extracted.

In this case, modified data may be extracted by checking the at least one OS image file loaded into the analysis target terminal in accordance with multi-booting, among multiple OS image files.

For example, in an image list including multiple OS image files, at least one OS image file to be used for multi-booting may be selected, thus enabling the analysis target terminal to be booted. That is, modified data may be more effectively extracted by checking only at least one OS image file, which is actually loaded into the analysis target terminal, without needing to check modified data for all multiple OS image files.

Here, modified data may be extracted by comparing at least one OS image file loaded into the analysis target terminal with at least one original OS image file corresponding to the at least one OS image file.

For example, the malicious code analysis device 110 may include an OS image DB for storing original OS image files corresponding to multiple OS image files. Therefore, at least one OS image file, the data of which is expected to have been modified by malicious code, is compared only with the original OS image file corresponding to the OS image file, and thus data modified by the malicious code may be effectively extracted.

Here, since all analysis actions, including the monitoring of execution of malicious code and the extraction of data, are performed by the malicious code analysis device 110, which is located outside of the analysis target terminal, the procedure for analyzing malicious code may be more efficient than existing analysis techniques that use a virtual environment or a sandbox.

The malicious code analysis unit 240 analyzes malicious code in consideration of the modified data and the user input.

Here, activity corresponding to the malicious code may be analyzed by combining the modified data with the user input.

That is, the activity of malicious code may be analyzed by combining the modified data corresponding to a change in state that appears when malicious code is executed on the analysis target terminal, which is the target to be monitored, with user input corresponding to an item input from the external device connected via the USB cable.

Here, a separate analysis device for analyzing malicious code may be provided, and thereby the modified data and the user input may be transferred to the separate analysis device and may be used to analyze malicious code.

Further, an analysis result DB for storing the result of analysis of malicious code may be separately provided, and may then be used to provide data in order to identify whether or not a file executed on the actual machine is malicious.

When the analysis of malicious code has been completed, the OS image restoration unit 250 restores at least one OS image file using original OS image files corresponding to multiple OS image files stored in the OS image DB. That is, the at least one OS image file in which data modified by malicious code is present may be restored using a clean original OS image file.

The storage unit 260 stores various types of information generated in the malicious code analysis procedure according to the embodiment of the present invention.

In accordance with the embodiment, the storage unit 260 may be configured independent of the malicious code analysis device 110 to support a function of malicious code analysis. Here, the storage unit 260 may be operated as separate large-capacity storage, and may include a control function for performing operations.

Meanwhile, the malicious code analysis device 110 may be equipped with memory and may store information in the device. In an embodiment, the memory is a computer-readable storage medium. In an embodiment, the memory may be a volatile memory unit, and in another embodiment, the memory may be a nonvolatile memory unit. In an embodiment, the storage device may be a computer-readable storage medium. In various different embodiments, the storage device may include, for example, a hard disk, an optical disk device, or another large-capacity storage device.

By utilizing the malicious code analysis device 110, analysis is performed on the analysis target terminal corresponding to an actual machine, and malicious code is observed and analyzed from outside the analysis target terminal, thus enabling pieces of environment-aware malicious code to be analyzed.

Further, the present invention provides activity simulation for transferring user input as if the user had personally made the user input, thus enabling analysis environment-aware malicious code to be analyzed using the user input. Furthermore, the present invention may analyze malicious code in various devices, such as a PC and a mobile device, and in various OS environments, such as Windows and Linux, by analyzing malicious code based on a USB cable, which is generally used.

Real-time activity caused by malicious code may be extracted and analyzed, and thus the activity of malicious code may be accurately detected in greater detail.

Figure 3:
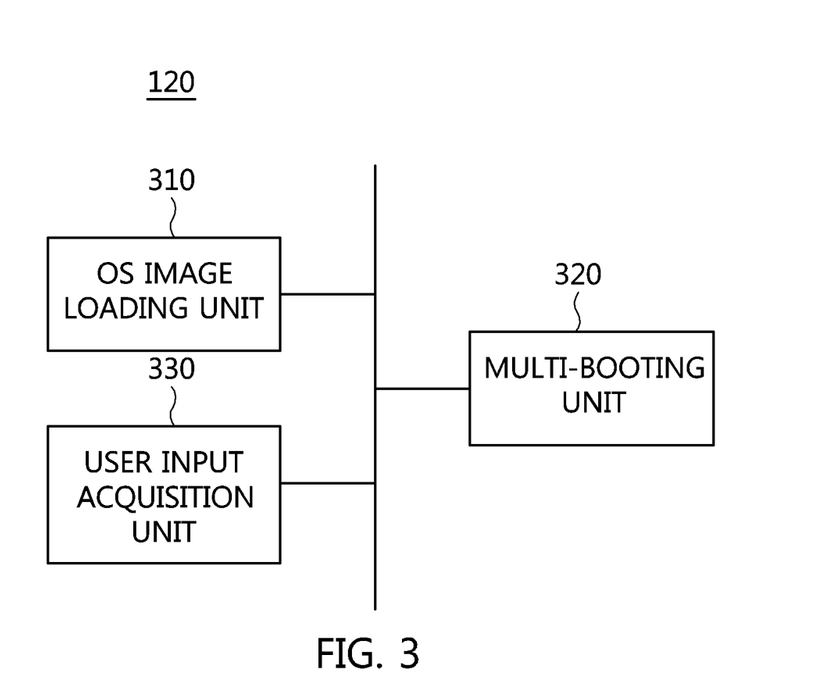
FIG. 3 is a block diagram showing an example of the analysis target terminal shown in FIG. 1.

FIG. 3 is a block diagram showing an example of the analysis target terminal shown in FIG. 1.

Referring to FIG. 3, the analysis target terminal 120 shown in FIG. 1 includes an OS image loading unit 310, a multi-booting unit 320, and a user input acquisition unit 330.

The OS image loading unit 310 loads at least one OS image file to be used for multi-booting, among multiple OS image files from a malicious code analysis device, connected via a USB cable. For example, when the malicious code analysis device provides an image list including multiple OS image files, the OS image loading unit 310 may select at least one OS image file to be used for multi-booting, from among the multiple OS image files included in the list, and may load the selected OS image file.

Here, the multiple OS image files may correspond to various OSs, such as Windows, Linux, and Android. Therefore, the present invention may be freely utilized on devices that are operated based on OS image files, such as a PC and a mobile device.

The multi-booting unit 320 performs multi-booting based on at least one OS image file. For example, the analysis target terminal may be booted by installing Windows and Linux on the computer corresponding to the analysis target terminal using, for example, an OS image file corresponding to Windows and an OS image file corresponding to Linux.

The user input acquisition unit 330 acquires user input from the malicious code analysis device so that the malicious code cannot recognize that the current environment is an analysis environment.

Here, by acquiring user input, malicious code that recognizes an automated analysis environment based on whether user input has occurred and does not conduct malicious activity may be analyzed. That is, malicious code may be efficiently analyzed by inducing the execution of malicious code having an execution avoidance function.

The user input may occur based on at least one input module connected to the malicious code analysis device.

Here, the at least one input module may be an executable module capable of executing a script, as well as a module for allowing a user to personally make input, such as a keyboard, a mouse, or a touchpad.

The user input may be at least one of manual input corresponding to at least one of mouse input, keyboard input, and touch input, and automatic input based on a script.

Figure 4:
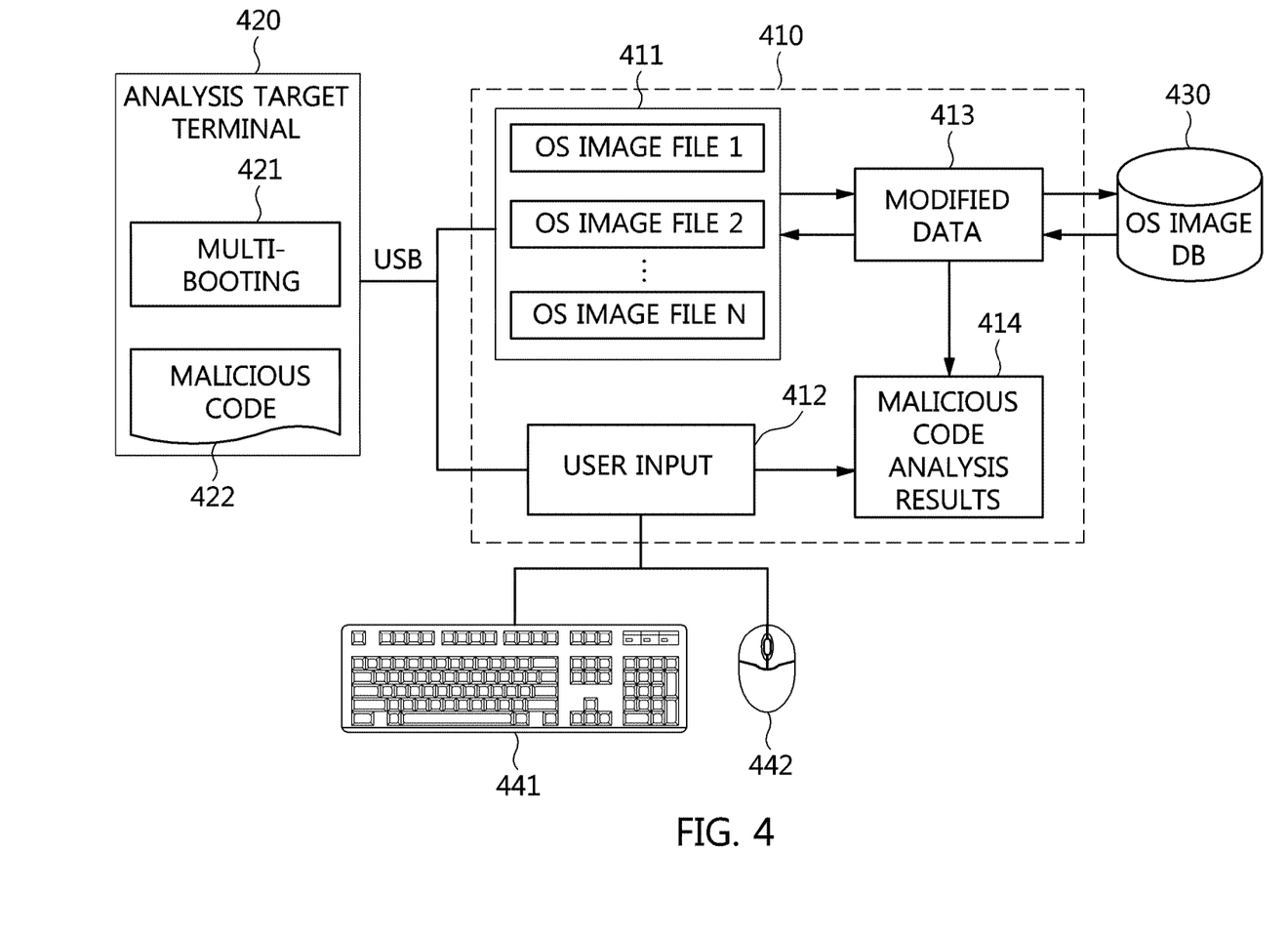
FIG. 4 is a diagram showing in detail a malicious code analysis system based on an external device connected via a USB cable according to an embodiment of the present invention.

FIG. 4 is a diagram showing in detail a malicious code analysis system based on an external device connected via a USB cable according to an embodiment of the present invention.

Referring to FIG. 4, a malicious code analysis system based on an external device connected via a USB cable according to the embodiment of the present invention may analyze malicious code based on a malicious code analysis device 410 connected via a USB cable to the analysis target terminal 420 shown in FIG. 4, according to an embodiment of the present invention.

Here, the malicious code analysis device 410 may provide a list 411 of multiple OS image files to the analysis target terminal 420 through a USB connection. Here, the analysis target terminal 420 may be booted by selecting at least one OS image file from among N OS image files included in the OS image file list 411 through a multi-boot loader 421 for performing multi-booting.

In the analysis target terminal 420, various types of malicious code 422 may be executed.

Thereafter, the malicious code analysis device 410 acquires user input 412 from an input module 441 or 442 connected thereto and may provide the acquired user input 412 to the analysis target terminal 420 based on a USB connection.

In the present invention, malicious code is executed on an actual machine, such as the analysis target terminal 420, and the monitoring and analysis of malicious code are performed by the malicious code analysis device 410, which is located outside of the analysis target terminal 420. Thus, the analysis target terminal 420 may also analyze pieces of malicious code that recognize a virtual environment or a sandbox and avoid being executed. Also, the analysis target terminal 420 may analyze pieces of malicious code that recognize user input and avoid being executed, by performing activity simulation as if the user had actually made input, that is, by providing user input.

Here, the malicious code analysis device 410 may extract modified data from at least one OS image file used for booting on the analysis target terminal 420. For example, a modified portion may be checked by comparing an original OS image file, corresponding to at least one OS image file stored in an OS image DB 430, with the at least one OS image file.

Thereafter, the malicious code analysis device 410 may generate malicious code analysis results 414 by combining modified data 413 with the user input 412 and analyzing the combined data.

Figure 5:
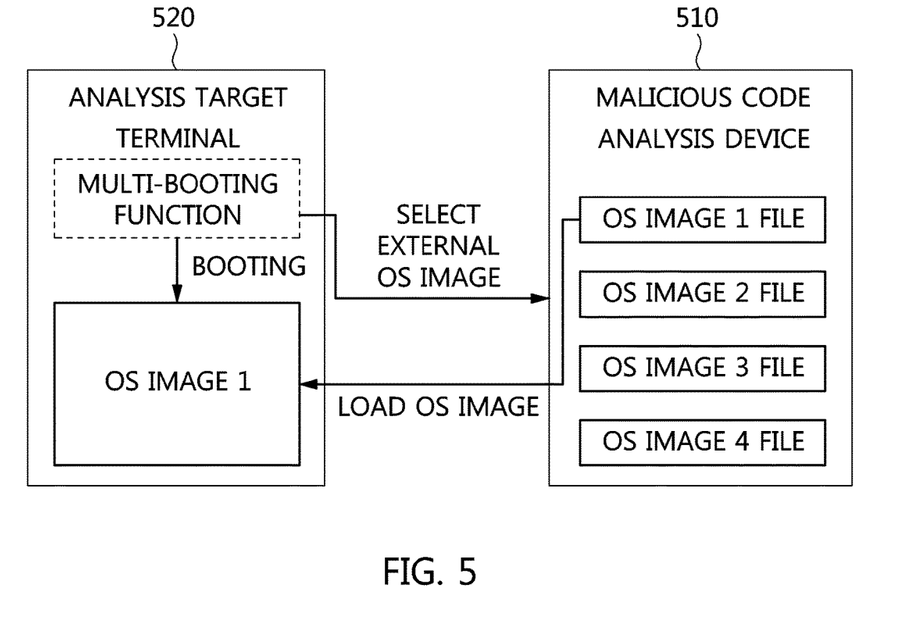
FIG. 5 is a diagram showing a multi-booting procedure performed by an analysis target terminal according to an embodiment of the present invention.

FIG. 5 is a diagram showing the multi-booting procedure performed by an analysis target terminal according to an embodiment of the present invention.

Referring to FIG. 5, the multi-booting procedure performed by the analysis target terminal according to the embodiment of the present invention may provide a list of multiple OS image files in order for a malicious code analysis device 510 connected to an analysis target terminal 520 via a USB cable to provide an analysis environment.

Here, the analysis target terminal 520 may select and load at least one OS image file from a list of multiple OS image files corresponding to external OS images.

Thereafter, the analysis environment required to analyze malicious code may be configured in the analysis target terminal 520 by booting the at least one OS image file loaded into the analysis target terminal 520.

Figure 6:
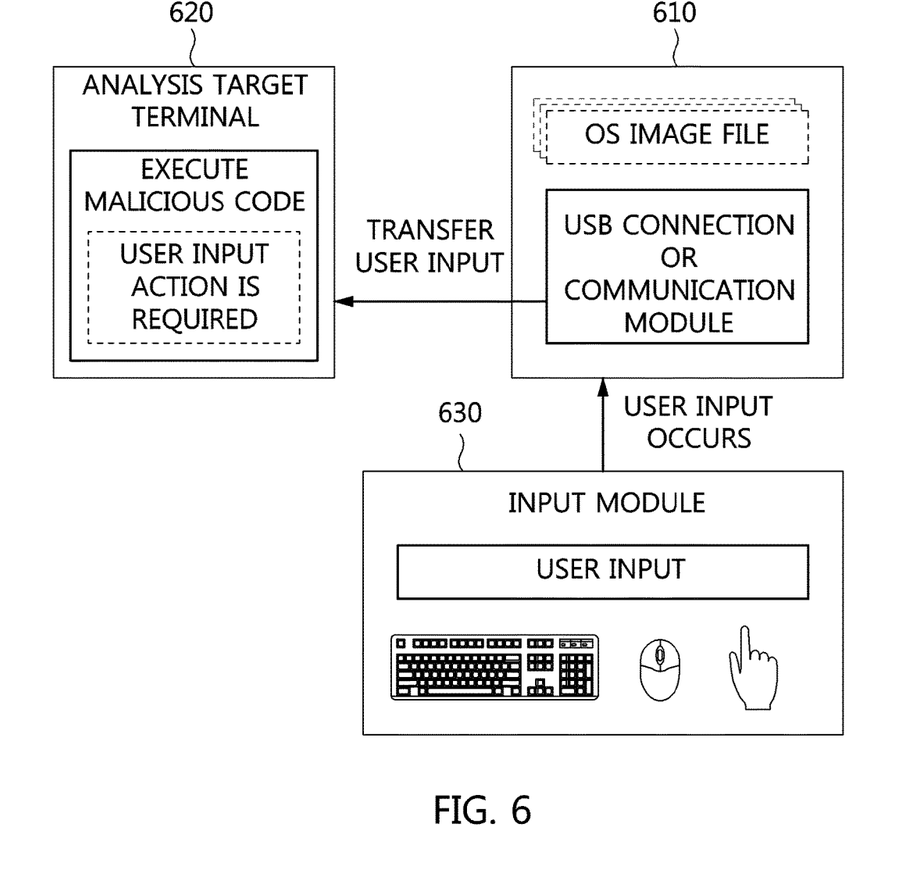
FIG. 6 is a diagram showing a procedure for transferring user input to the analysis target terminal according to an embodiment of the present invention.

FIG. 6 is a diagram showing a procedure for transferring user input to the analysis target terminal according to an embodiment of the present invention.

Referring to FIG. 6, the procedure for transferring user input to the analysis target terminal according to the embodiment of the present invention may acquire user input based on an input module 630 connected to a malicious code analysis device 610. That is, when user input occurs through the input module 630, the malicious code analysis device 610 to which the input module 630 is connected may acquire the user input.

Thereafter, the user input may be transferred to the analysis target terminal 620 using a connection via a USB cable or a communication module.

In this way, the user input is provided to the analysis target terminal 620, so that data attributable to malicious code, which recognizes an automated analysis environment based on whether user input has occurred, is also acquired, thus enabling the malicious code to be analyzed.

Here, the user input may be acquired by allowing the user to personally manipulate a mouse or a keyboard, or alternatively, the user input may be generated and transferred using an automated method such as a script.

Figure 7:
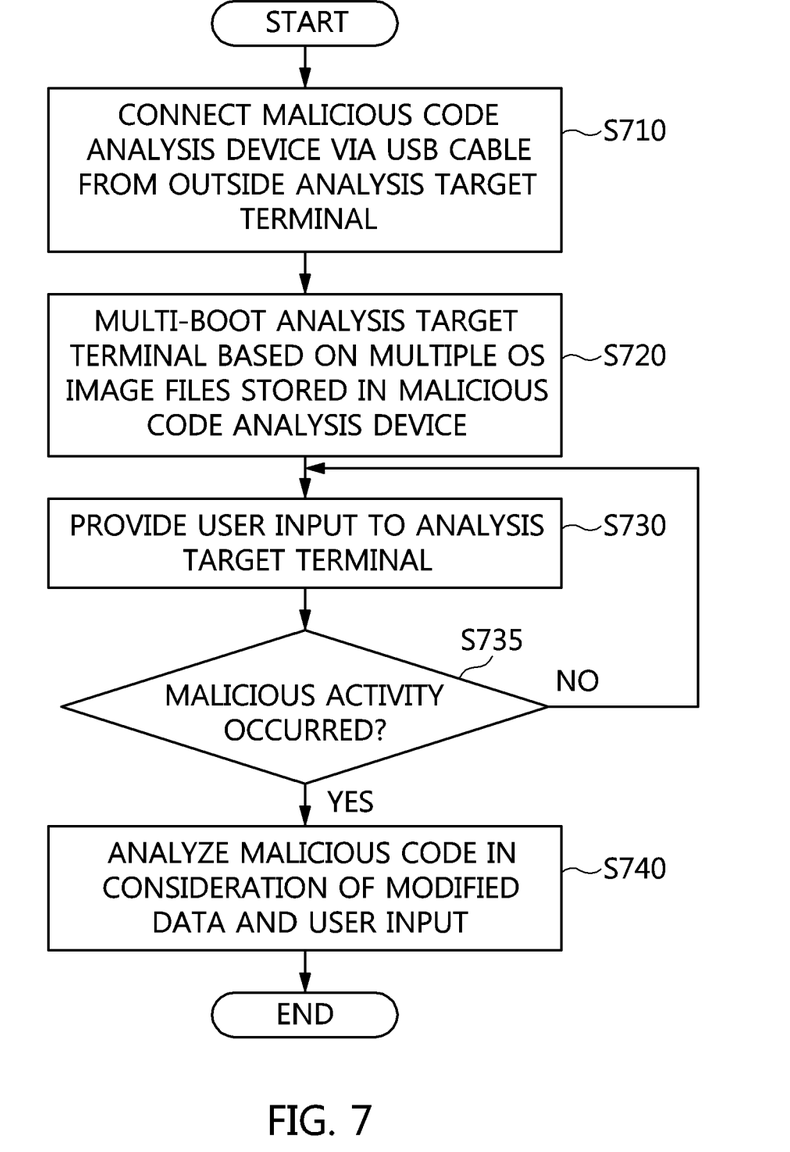
FIG. 7 is an operation flowchart showing a malicious code analysis method based on an external device connected via a USB cable according to an embodiment of the present invention.

FIG. 7 is an operation flowchart showing a malicious code analysis method based on an external device connected via a USB cable according to an embodiment of the present invention.

Referring to FIG. 7, the malicious code analysis method based on an external device connected via a USB cable according to the embodiment of the present invention connects a malicious code analysis device to an analysis target terminal, on which malicious code will be executed, via a USB cable from outside the analysis target terminal at step S710.

Here, the activity of the malicious code may be detected and analyzed using the malicious code analysis device externally connected to the analysis target terminal via the USB cable when the malicious code is executed in an actual environment rather than in a virtual environment.

As analysis techniques using a virtual environment or a sandbox have recently become known as malicious code analysis techniques for PCs and mobile devices, the incidence of malicious code that recognizes such a virtual environment or sandbox and is not executed has increased. Therefore, the present invention intends to provide a malicious code analysis device 110 that is capable of analyzing even malicious code that recognizes such a virtual environment- or sandbox-based analysis environment.

Here, the malicious code analysis device is connected using a USB protocol based on USB, so that the malicious code analysis method according to the present invention may be applied to devices equipped with a USB function. Further, the present invention may also be used in a PC or a mobile device because a USB function is supported in various OSs, such as Windows and Linux.

That is, the malicious code analysis method according to the present invention may be operated in various OSs such as Windows, Linux, or Android, and monitoring for extracting and analyzing the activity of malicious code is performed by the malicious code analysis device, which is a device located outside of the analysis target terminal, thus enabling even sandbox-aware malicious code to be analyzed. Further, since the present invention has a structure such that it operates in an actual system, virtual environment-aware malicious code may also be analyzed.

Further, the malicious code analysis method based on an external device connected via a USB cable according to the embodiment of the present invention multi-boots the analysis target terminal based on multiple OS image files stored in the malicious code analysis device at step S720.

Here, the OS image files, previously booted on the analysis target terminal, may already contain data modified by malicious code. Therefore, for the accuracy of analysis, since the analysis target terminal is booted based on the multiple OS image files provided by the malicious code analysis device before the malicious code is analyzed, analysis may be initiated in a clean analysis environment which is uncontaminated with malicious code.

Here, in order to execute malicious code on the analysis target terminal, which is an actual system such as a PC or a mobile device, rather than in the virtual environment, the malicious code analysis device may provide multiple OS image files corresponding to analysis environments to the analysis target terminal.

The multiple OS image files are loaded from the outside of the analysis target terminal connected thereto via the USB cable to perform booting, and addition, change and deletion of the OS image files may be more easily performed from outside the analysis target terminal because no images in an internal storage device are used.

Further, the malicious code analysis method based on an external device connected via a USB cable according to the embodiment of the present invention provides user input to the analysis target terminal so that the malicious code cannot recognize that the current environment is an analysis environment at step S730.

Here, by providing the user input to the analysis target terminal, even malicious code, which recognizes that the current environment is an automatic malicious code analysis environment based on whether user input has occurred, may also be analyzed. That is, as in the case of the user input, activity simulation for transferring user input as if the user had personally made the user input may be provided.

Here, the user input may be acquired using at least one input module connected to the malicious code analysis device.

Here, the malicious code analysis device may transfer the user input to the analysis target terminal using at least one of the USB cable and the communication module included in the malicious code analysis device.

For example, the malicious code analysis device may acquire user input occurring in at least one input module, and may transfer the acquired user input to the analysis target terminal, which is connected thereto via the USB cable.

The user input may be at least one of manual input corresponding to at least one of mouse input, keyboard input, and touch input, and automatic input based on a script. For example, the user input may be manually made by allowing the user to personally manipulate a keyboard or a mouse or, alternatively, the user input may be generated and transferred using an automated method such as a script.

Here, the user input may be at least one of manual input corresponding to at least one of mouse input, keyboard input, and touch input, and automatic input based on a script.

Further, the malicious code analysis method based on an external device connected via a USB cable according to the embodiment of the present invention determines whether malicious activity caused by malicious code has occurred in the analysis target terminal at step S735.

As a result of the determination at step S735, when malicious activity has occurred, the malicious code analysis method based on an external device connected via a USB cable according to the embodiment of the present invention allows the malicious code analysis device to analyze the malicious code in consideration of both data modified by the malicious code, among pieces of data corresponding to multiple OS image files, and the user input at step S740.

Among the multiple OS image files, at least one OS image file, loaded into the analysis target terminal in accordance with multi-booting, is checked, and then modified data may be extracted.

For example, at least one OS image file to be used for multi-booting may be selected from an image list including the multiple OS image files, and may then be used to boot the analysis target terminal. That is, modified data may be more effectively extracted by checking only the at least one OS image file that is actually loaded into the analysis target terminal, without needing to check modified data in all of the multiple OS image files.

Here, when executable code required to detect the execution of malicious code is executed in an environment in which malicious code is executed, the activity of monitoring code and the activity of the malicious code occur simultaneously, and thus it may be difficult to analyze the malicious code.

Therefore, the present invention may provide an environment in which malicious code may be analyzed in an external space separate from an actual machine by loading an OS image file into the analysis target terminal on which malicious code is executed through the malicious code analysis device, which is externally connected via the USB cable. Further, real-time activity corresponding to intermediate activity, as well as the results of the activity of the malicious code, may be extracted.

Here, modified data may be extracted by comparing at least one OS image file loaded into the analysis target terminal with at least one original OS image file corresponding to the at least one OS image file.

For example, the malicious code analysis device may include an OS image DB for storing original OS image files corresponding to multiple OS image files. Therefore, at least one OS image file, the data of which is expected to have been modified by malicious code, is compared only with the original OS image file corresponding to the OS image file, and thus data modified by the malicious code may be effectively extracted.

Here, since all analysis actions, including the monitoring of execution of malicious code and the extraction of data, are performed by the malicious code analysis device, which is located outside of the analysis target terminal, the procedure for analyzing malicious code may be more efficient than existing analysis techniques that use a virtual environment or a sandbox.

Here, activity corresponding to the malicious code may be analyzed by combining the modified data with the user input.

That is, the activity of malicious code may be analyzed by combining the modified data corresponding to a change in state that appears when malicious code is executed on the analysis target terminal, which is the target to be monitored, with user input corresponding to an item input from the external device connected via the USB cable.

Here, the malicious code analysis device may include a separate analysis device for analyzing malicious code, and thereby the modified data and the user input may be transferred to the separate analysis device and may be used to analyze malicious code.

Further, the malicious code analysis device may separately include an analysis result DB for storing the result of analysis of malicious code, and may then use the analysis result DB to provide data in order to identify whether or not a file executed on the actual machine is malicious.

Furthermore, when malicious activity has not occurred as a result of the determination at step S735, user input is again provided to the analysis target terminal.

Also, although not shown in FIG. 7, the malicious code analysis method based on an external device connected via the USB cable according to the embodiment of the present invention restores at least one OS image file using original OS image files corresponding to multiple OS image files stored in the OS image DB when the analysis of the malicious code is completed. That is, at least one OS image file containing data modified by the malicious code may be restored using a clean original OS image file.

Further, although not shown in FIG. 7, the malicious code analysis method based on an external device connected via a USB cable according to the embodiment of the present invention stores various types of information generated during the malicious code analysis procedure, as described above.

By utilizing the malicious code analysis method, analysis is performed on the analysis target terminal corresponding to an actual machine, and malicious code is observed and analyzed from outside the analysis target terminal, thus enabling pieces of environment-aware malicious code to be analyzed.

Further, the present invention provides activity simulation for transferring user input as if the user had personally made the user input, thus enabling analysis environment-aware malicious code to be analyzed using the user input. Furthermore, the present invention may analyze malicious code in various devices, such as a PC and a mobile device, and in various OS environments, such as Windows and Linux, by analyzing malicious code based on a USB cable, which is generally used.

Real-time activity caused by malicious code may be extracted and analyzed, and thus the activity of malicious code may be accurately detected in greater detail.

Figure 8:
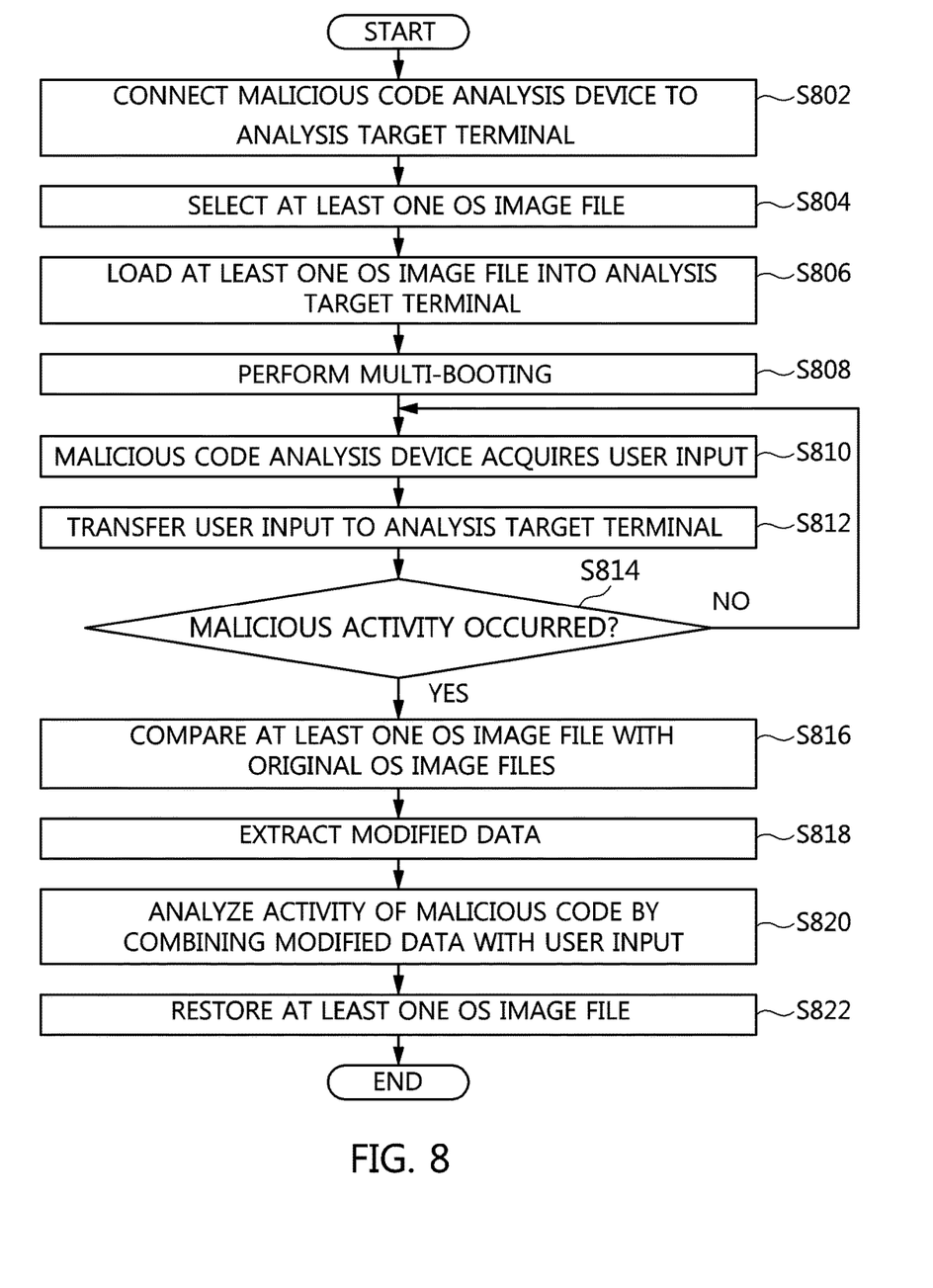
FIG. 8 is an operation flowchart showing in detail a malicious code analysis method based on an external device connected via a USB cable according to an embodiment of the present invention.

FIG. 8 is an operation flowchart showing in detail a malicious code analysis method based on an external device connected via a USB cable according to an embodiment of the present invention.

Referring to FIG. 8, in the malicious code analysis method based on an external device connected via a USB cable according to the embodiment of the present invention, a malicious code analysis device is connected to an analysis target terminal, on which malicious code is to be executed, using a USB cable at step S802.

Here, the malicious code analysis device is connected to the analysis target terminal via the USB cable from outside the analysis target terminal, and malicious code is analyzed, thus enabling the analysis of malicious code that recognizes a virtual environment and avoids being executed. Further, the malicious code analysis device monitors and analyzes malicious code, thereby enabling the analysis of malicious code that recognizes a sandbox present in the analysis target terminal and avoids being executed.

Thereafter, the analysis target terminal selects at least one OS image file to be used for multi-booting from among the multiple OS image files stored in the malicious code analysis device at step S804.

Next, the at least one OS image file is loaded into the analysis target terminal at step S806.

Thereafter, the analysis target terminal performs multi-booting in accordance with the at least one OS image file at step S808.

In this case, OS image files previously booted on the analysis target terminal may already contain data modified by malicious code. Therefore, for accuracy of analysis, the analysis target terminal is booted based on the multiple OS image files provided by the malicious code analysis device before the malicious code is analyzed, and thus analysis may be initiated in a clean analysis environment uncontaminated with malicious code.

Thereafter, the malicious code analysis device acquires user input from at least one input module at step S810.

Here, the user input may be at least one of manual input corresponding to at least one of mouse input, keyboard input, and touch input, and automatic input based on a script. For example, the user input may be manually made by allowing the user to personally manipulate a keyboard or a mouse or, alternatively, the user input may be generated and transferred using an automated method such as a script.

Here, the user input may be at least one of manual input corresponding to at least one of mouse input, keyboard input, and touch input, and automatic input based on a script.

Thereafter, the malicious code analysis device transfers the user input to the analysis target terminal at step S812.

Here, by providing the user input to the analysis target terminal, even malicious code that recognizes that the current environment is an automatic malicious code analysis environment based on whether user input has occurred may be analyzed. That is, as in the case of the user input, an activity simulation function of transferring the input as if a person had personally manipulated the terminal may be provided.

The user input may be acquired using at least one input module connected to the malicious code analysis device.

Here, the malicious code analysis device may transfer the user input to the analysis target terminal using at least one of the USB cable and the communication module included in the malicious code analysis device.

Thereafter, the malicious code analysis device monitors the analysis target terminal, and then determines whether malicious activity has occurred in the analysis target terminal due to the malicious code at step S814.

If malicious activity has not occurred as a result of the determination at step S814, user input is continuously acquired from at least one input module.

In contrast, when malicious activity has occurred as a result of the determination at step S814, the at least one OS image file loaded into the analysis target terminal is compared with at least one original OS image file corresponding to the OS image file at step S816.

For example, the malicious code analysis device may include an OS image DB for storing original OS image files corresponding to multiple OS image files. Therefore, data modified by malicious code may be effectively extracted by comparing at least one OS image file, expected to contain data modified by the malicious mode, with only the original OS image file corresponding thereto.

Thereafter, the data modified by malicious code is extracted from the at least one OS image file loaded into the analysis target terminal at step S818.

Then, the malicious code analysis device analyzes the activity of the malicious code by combining the modified data with the user input at step S820.

That is, the activity of the malicious code may be analyzed by combining modified data, corresponding to a change in state that appears when malicious activity caused by the malicious code occurs in the analysis target terminal, which is the monitoring target, with user input corresponding to an item input from the external device, which is connected via the USB cable.

Next, after the analysis of the malicious code has been completed, at least one OS image file modified by malicious code in the analysis target terminal is restored to a clean state using original OS image files corresponding to the multiple OS image files stored in the OS image DB at step S822.

In accordance with the present invention, the analysis of environment-aware malicious code may be performed in such a way that analysis is performed on an analysis target terminal, which is an actual machine, and malicious code is observed and analyzed from outside the analysis target terminal.

Further, the present invention may provide activity simulation for transferring user input as if a user has personally made the user input, thus enabling analysis environment-aware malicious code using the user input to be analyzed.

Furthermore, the present invention may enable malicious code to be analyzed in various devices, such as a PC and a mobile device, and in various OS environments, such as Windows and Linux, by analyzing malicious code based on a USB device that is generally used.

Furthermore, the present invention may accurately detect the activity of malicious code in greater detail by extracting and analyzing the real-time activity caused by the malicious code.

As described above, in the malicious code analysis system based on an external device connected via a USB cable and the method using the system according to the present invention, the configurations and schemes in the above-described embodiments are not limitedly applied, and some or all of the above embodiments can be selectively combined and configured so that various modifications are possible.

What is claimed is:

1. A malicious code analysis method based on an external device connected via a Universal Serial Bus (USB) cable, the malicious code analysis method comprising:
connecting a malicious code analysis device to an analysis target terminal on which malicious code is to be executed, the malicious code analysis device being located outside the analysis target terminal and connected to the analysis target terminal via the USB cable;
multi-booting the analysis target terminal based on multiple Operating System (OS) image files stored in the malicious code analysis device;
providing a user input to the analysis target terminal to thereby prevent the malicious code from recognizing that a current environment is an analysis environment, after the analysis target terminal has been multi-booted based on the multi OS image files;
analyzing, by the malicious code analysis device, the malicious code in consideration of both the user input and data modified by the malicious code among data corresponding to the multiple OS image files,
wherein the analyzing the malicious code comprises:
extracting both a real-time activity of the malicious code, which corresponds to an intermediate activity of the malicious code being executed on the analysis target terminal, and a result of a modification made to the analysis target terminal after the malicious code is executed on the analysis target terminal; and
checking, by the malicious code analysis device, at least one OS image file loaded into the analysis target terminal in accordance with the multi-booting, among the multiple OS image files, from outside the analysis target terminal, and then extracting the modified data; and
restoring the at least one OS image file.

2. The malicious code analysis method of claim 1, wherein the analyzing the malicious code comprises:

extracting the modified data by comparing the at least one OS image file with at least one original OS image file corresponding to the at least one OS image file among the multiple OS image files.

3. The malicious code analysis method of claim 1, wherein the providing the user input comprises:
acquiring the user input using at least one input module connected to the malicious code analysis device; and
transferring, by the malicious code analysis device, the user input to the analysis target terminal based on at least one of the USB cable and a communication module included in the malicious code analysis device.

4. The malicious code analysis method of claim 3, wherein the user input is at least one of manual input and automatic input, the manual input corresponding to at least one of mouse input, keyboard input, and touch input, and the automatic input being based on a script.

5. The malicious code analysis method of claim 2, further comprising restoring the at least one OS image file using the at least one original OS image file stored in an OS image database (DB), when the analysis of the malicious code is completed.

6. The malicious code analysis method of claim 1, wherein the analyzing the malicious code comprises analyzing an activity corresponding to the malicious code by combining the modified data with the user input.

7. A malicious code analysis device based on an external device connected via a Universal Serial Bus (USB) cable, comprising:
one or more processors that process computer executable program code embodied in non-transitory computer readable storage media,
wherein the computer executable program code is executed to:
connecting a malicious code analysis device to an analysis target terminal on which malicious code is to be executed, the malicious code analysis device being located outside the analysis target terminal and connected to the analysis target terminal via the USB cable;
provide multiple Operating System (OS) image files to an analysis target terminal connected via the USB cable;
provide a user input to the analysis target terminal to thereby prevent malicious code from recognizing that a current environment is an analysis environment, after the analysis target terminal has been multi-booted based on the multiple OS image files;
extract data modified by the malicious code from among data corresponding to the multiple OS image files;
extract both a real-time activity of the malicious code, which corresponds to an intermediate activity of the malicious code being executed on the analysis target terminal, and a result of a modification made to the analysis target terminal after the malicious code is executed on the analysis target terminal;
analyze the malicious code in consideration of the modified data and the user input;
check at least one OS image file loaded into the analysis target terminal in accordance with the multi-booting, among the multiple OS image files, and then extracts the modified data from outside the analysis target terminal, and then extracting the modified data; and
restore at least one OS image file.

8. The malicious code analysis device of claim 7, wherein the computer executable program code extracts the modified data by comparing the at least one OS image file with at least one original OS image file corresponding to the at least one OS image file, among the multiple OS image files.

9. The malicious code analysis device of claim 7, wherein the computer executable program code acquires the user input using at least one input module, and transfers the acquired user input to the analysis target terminal.

10. The malicious code analysis device of claim 9, wherein the user input is at least one of manual input and automatic input, the manual input corresponding to at least one of mouse input, keyboard input, and touch input, and the automatic input being based on a script.

11. The malicious code analysis device of claim 8, wherein the computer executable program code restores the at least one OS image file using the at least one original OS image file stored in an OS image database (DB) when analysis of the malicious code is completed.

12. The malicious code analysis device of claim 7, wherein the computer executable program code analyzes activity corresponding to the malicious code by combining the modified data with the user input.

* * * * *